United States Patent [19]
Williams

[11] Patent Number: 6,164,595
[45] Date of Patent: Dec. 26, 2000

[54] HELIUM ACTUATED AIRPLANE PARACHUTE

[76] Inventor: Charles Williams, 629 Fishkill Ave., Beacon, N.Y. 12508

[21] Appl. No.: 09/301,812

[22] Filed: Apr. 29, 1999

[51] Int. Cl.[7] .................................................. B64D 17/80
[52] U.S. Cl. .......................................... 244/139; 244/147
[58] Field of Search .................................... 244/139, 147, 244/149, 140

[56] References Cited

U.S. PATENT DOCUMENTS

| | | | |
|---|---|---|---|
| 1,823,799 | 9/1931 | Friedrich | 244/139 |
| 1,844,740 | 2/1932 | Bradley | 244/139 |
| 1,852,439 | 4/1932 | Stone | 244/147 |
| 2,665,093 | 1/1954 | Manfredi et al. | 244/139 |
| 3,051,420 | 8/1962 | Novak | 244/139 |

*Primary Examiner*—Robert P. Swiatek

[57] ABSTRACT

A helium actuated airplane parachute including an airplane having a rectangular compartment formed therein with an associated top opening. A flexible inelastic parachute is included having a closed hemispherical configuration with an open bottom having a peripheral edge. A plurality of strings each have a first end spacedly coupled to the peripheral edge and a second end mounted to a bottom face of the compartment. A helium gas tank is situated adjacent the compartment. The gas tank is connected to an actuator valve mounted on the bottom face of the compartment below the parachute when in a folded undeployed orientation. The actuator valve is adapted to release gas within the compartment thereby deploying the parachute.

5 Claims, 1 Drawing Sheet

HELIUM ACTUATED AIRPLANE PARACHUTE

BACKGROUND OF THE INVENTION

1. Field of the Invention

The present invention relates to a helium actuated airplane parachute and more particularly pertains to preventing casualties resulting from airplane crashes.

2. Description of the Prior Art

The use of airplane parachutes is known in the prior art. More specifically, airplane parachutes heretofore devised and utilized for the purpose of slowing a descending airplane are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 4,298,177; U.S. Pat. No. 4,050,657; U.S. Pat. No. Des. 358,362; U.S. Pat. No. 4,445,654; U.S. Pat. No. 4,480,807; and U.S. Pat. No. 4,113,208.

In this respect, the helium actuated airplane parachute according to the present invention substantially departs from the conventional concepts and designs of the prior art, and in so doing provides an apparatus primarily developed for the purpose of preventing casualties resulting from airplane crashes.

Therefore, it can be appreciated that there exists a continuing need for a new and improved helium actuated airplane parachute which can be used for preventing casualties resulting from airplane crashes. In this regard, the present invention substantially fulfills this need.

SUMMARY OF THE INVENTION

In view of the foregoing disadvantages inherent in the known types of airplane parachutes now present in the prior art, the present invention provides an improved helium actuated airplane parachute. As such, the general purpose of the present invention, which will be described subsequently in greater detail, is to provide a new and improved helium actuated airplane parachute which has all the advantages of the prior art and none of the disadvantages.

To attain this, the present invention essentially comprises an airplane having a central portion with a pair of primary wings mounted to a top extent thereof. Such primary wings extend perpendicularly from the central portion adjacent a front of the airplane. The airplane further includes a pair of secondary wings each extending from a rear of the central portion of the airplane. The central portion further has a rectangular compartment formed therein with an associated top opening. This top opening is situated at the top extent of the central portion between the primary and secondary wings. As shown in FIG. 2, the top opening has a break away door hingably coupled adjacent thereto. During use, the door is adapted to open only upon the presence of a sufficient pressure from within the compartment. Also included is a flexible inelastic parachute having a closed hemispherical configuration with an open bottom having a peripheral edge. A plurality of strings each have a first end spacedly coupled to the peripheral edge and a second end mounted to a bottom face of the compartment. Finally, a helium tank is situated within the central portion of the airplane and adjacent the compartment. The helium tank is connected to an actuator valve mounted on the bottom face of the compartment below the parachute when in a folded undeployed orientation.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved helium actuated airplane parachute which has all the advantages of the prior art airplane parachutes and none of the disadvantages.

It is another object of the present invention to provide a new and improved helium actuated airplane parachute which may be easily and efficiently manufactured and marketed.

It is a further object of the present invention to provide a new and improved helium actuated airplane parachute which is of a durable and reliable construction.

An even further object of the present invention is to provide a new and improved helium actuated airplane parachute which is susceptible of a low cost of manufacture with regard to both materials and labor, and which accordingly is then susceptible of low prices of sale to the consuming public, thereby making such helium actuated airplane parachute economically available to the buying public.

Still yet another object of the present invention is to provide a new and improved helium actuated airplane parachute which provides in the apparatuses and methods of the prior art some of the advantages thereof, while simultaneously overcoming some of the disadvantages normally associated therewith.

Still another object of the present invention is to prevent casualties resulting from airplane crashes.

Lastly, it is an object of the present invention to provide a new and improved helium actuated airplane parachute including an airplane having a rectangular compartment formed therein with an associated top opening. A flexible inelastic parachute is included having a closed hemispherical configuration with an open bottom having a peripheral edge. A plurality of strings each have a first end spacedly coupled to the peripheral edge and a second end mounted to a bottom face of the compartment. A helium gas tank is situated adjacent the compartment. The gas tank is connected to an actuator valve mounted on the bottom face of the compartment below the parachute when in a folded undeployed orientation. The actuator valve is adapted to release gas within the compartment thereby deploying the parachute.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
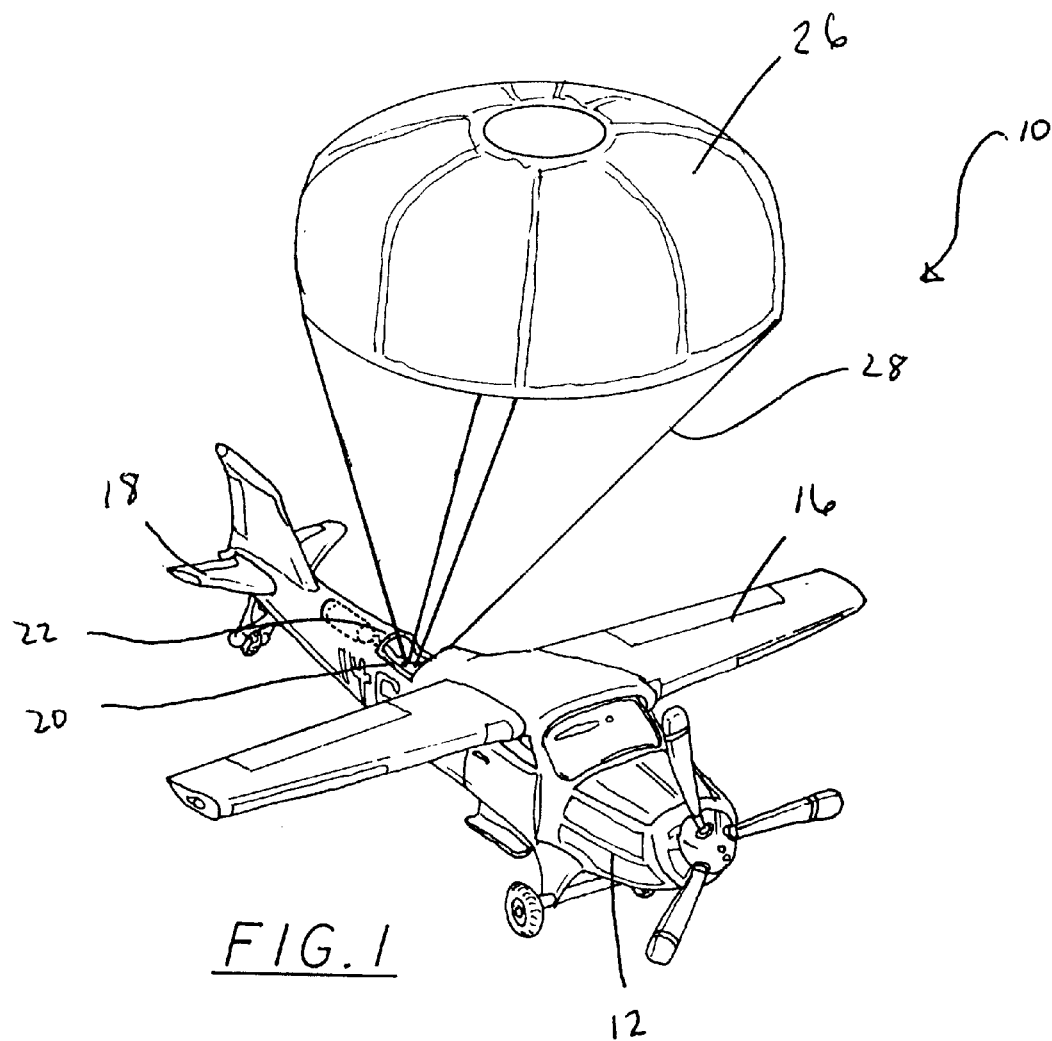
FIG. 1 is a perspective illustration of the preferred embodiment of the helium actuated airplane parachute constructed in accordance with the principles of the present invention.

With reference now to the drawings, and in particular to FIG. 1 thereof, a new and improved helium actuated airplane parachute embodying the principles and concepts of the present invention and generally designated by the reference numeral 10 will be described.

The present invention, the new and improved helium actuated airplane parachute, is comprised of a plurality of components. Such components in their broadest context include a compartment, parachute, and gas tank. Such components are individually configured and correlated with respect to each other so as to attain the desired objective.

More specifically, it will be noted that the system 10 of the present invention includes an airplane 12 having a central portion with a pair of primary wings 16 mounted to a top extent thereof. Such primary wings extend perpendicularly from the central portion adjacent a front of the airplane. The airplane further includes a pair of secondary wings 18 each extending from a rear of the central portion of the airplane. It should be understood that the airplane may take the form of either a jetliner or airplane.

Figure 2:
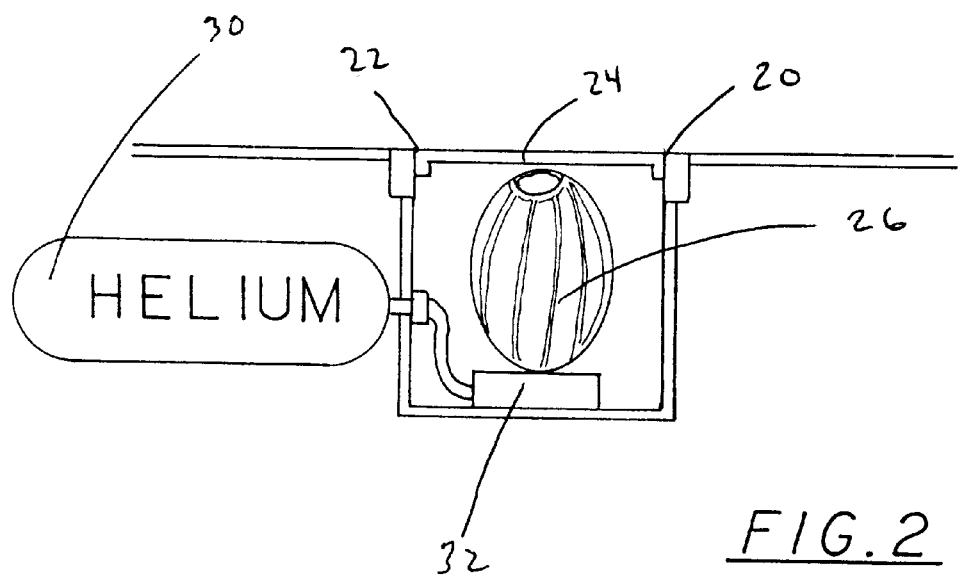
FIG. 2 is a cross-sectional view of the compartment prior to the deployment of the parachute.

The central portion further has a rectangular compartment 20 formed therein with an associated top opening 22. This top opening is situated at the top extent of the central portion between the primary and secondary wings. As shown in FIG. 2, the top opening has a break away door 24 hingably coupled adjacent thereto. During use, the door is adapted to open only upon the presence of a sufficient pressure from within the compartment. This may be accomplished with a friction latch or the like. Ideally, the compartment door is sealed air tight by way of an unillustrated gasket or the like prior to opening.

Also included is a flexible inelastic parachute 26 having a closed hemispherical configuration with an open bottom having a peripheral edge. A plurality of strings 28 is provided that each have a first end spacedly coupled to the peripheral edge and a second end mounted to a bottom face of the compartment.

Finally, a helium tank 30 is situated within the central portion of the airplane adjacent the compartment. The helium tank is connected to an actuator valve 32 mounted on the bottom face of the compartment below the parachute when in a folded undeployed orientation.

In operation, the actuator valve serves to create the predetermined amount of pressure within the compartment thereby forcing the parachute upwardly to open the door. This action deploys the parachute. It should be noted that activation of the actuator valve may take place by one of two methods. First, the cockpit may be equipped with a switch to manually activate the valve. In the alternative, the valve may be connected to the gauges of the airplane and activate automatically upon the detection of abnormal or emergency conditions. When actuated, the helium not only serves to open the door, but also to provide a predetermined amount of lift. As an option, the helium gas may be adapted to be emitted for a lengthy amount of time so as to be caught by the parachute.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved helium actuated airplane parachute comprising, in combination:

an airplane having a central portion with a pair of primary wings mounted to a top extent thereof and extending perpendicularly therefrom adjacent a front of the central portion of the airplane, the airplane further including a pair of secondary wings each extending from a rear of the central portion of the airplane, the central portion further having a rectangular compartment formed therein with an associated top opening situated at the top extent of the central portion between the primary and secondary wings, the top opening having a break away door hingably coupled adjacent thereto and adapted to open only upon the presence of a sufficient pressure from within the compartment;

a flexible inelastic parachute having a closed hemispherical configuration with an open bottom having a peripheral edge and a plurality of strings each having a first end spacedly coupled to the peripheral edge and a second end mounted to a bottom face of the compartment; and a helium tank situated within the central portion of the airplane and adjacent the compartment, the helium tank connected to an actuator valve mounted on the bottom face of the compartment below the parachute when in a folded undeployed orientation, the actuator valve adapted to create the predetermined amount of pressure within the compartment thereby deploying the parachute.

2. A gas actuated airplane parachute comprising:

an airplane having a compartment formed therein with an associated top opening;

a flexible inelastic parachute having a closed hemispherical configuration with an open bottom having a peripheral edge and a plurality of strings each having a first end spacedly coupled to the peripheral edge and a second end mounted to a bottom face of the compartment; and a gas tank situated adjacent the compartment, the gas tank connected to an actuator valve mounted on the bottom face of the compartment below the parachute when in a folded undeployed orientation, the actuator valve adapted to release gas within the compartment thereby deploying the parachute.

3. A gas actuated airplane parachute as set forth in claim 2 wherein the gas is helium.

4. A gas actuated airplane parachute as set forth in claim 2 wherein the compartment is mounted between primary and secondary wings of the airplane in a central portion thereof.

5. A gas actuated airplane parachute as set forth in claim 2 wherein the top opening of the compartment has a break away door for removing upon the release of gas from the gas tank.

* * * * *